United States Patent  (10) Patent No.: US 11,334,658 B2
Fong et al.  (45) Date of Patent: May 17, 2022

(54) SYSTEMS AND METHODS FOR CLOUD-BASED CONTINUOUS MULTIFACTOR AUTHENTICATION

(71) Applicant: PPIP LLC, Tempe, AZ (US)

(72) Inventors: Michael Fong, Chandler, AZ (US); Neric Hsin-wu Fong, Tempe, AZ (US); Stephen Kuo-Tung Seay Chan, Annapolis, MD (US)

(73) Assignee: PPIP, LLC, Chandler, AZ (US)

( * ) Notice: Subject to any disclaimer, the term of this patent is extended or adjusted under 35 U.S.C. 154(b) by 285 days.

(21) Appl. No.: 16/747,080

(22) Filed: Jan. 20, 2020

(65) Prior Publication Data

US 2021/0224375 A1    Jul. 22, 2021

(51) Int. Cl.
| | | |
|---|---|---|
| *G06F 21/35* | (2013.01) | |
| *G06F 21/43* | (2013.01) | |
| *G06F 21/44* | (2013.01) | |
| *H04L 29/06* | (2006.01) | |

(52) U.S. Cl.
CPC .............. *G06F 21/43* (2013.01); *G06F 21/35* (2013.01); *G06F 21/44* (2013.01); *H04L 63/0876* (2013.01); *G06F 2221/2103* (2013.01)

(58) Field of Classification Search
CPC .......... G06F 21/43; G06F 21/44; G06F 21/35; G06F 2221/2103; H04L 63/0876
See application file for complete search history.

(56) References Cited

U.S. PATENT DOCUMENTS

2018/0181741 A1 *   6/2018   Whaley .................. H04W 12/06
2020/0160346 A1 *   5/2020   Sethi ..................... G06Q 20/223

FOREIGN PATENT DOCUMENTS

WO    WO-2021034299 A1 *   2/2021    ............. G06F 1/163

* cited by examiner

*Primary Examiner* — Nelson S. Giddins (74) *Attorney, Agent, or Firm* — Fernando & Partners, LLP (57) ABSTRACT

Disclosed is an apparatus performing a method including: receiving, from an apparatus including a housing arranged to hold a personal communication device used by a user, a notification indicating a first authentication score of the user is below a first pre-determined threshold, providing a challenge to the personal communication device. In some embodiments, the challenge is selected based on one or more sensor data obtained by at least one of the apparatus or the personal communication device. In some embodiments, the method includes calculating a second authentication score based on a response to the challenge, and causing the apparatus, to gate electronic access to the personal communication device based on whether the second authentication score is above a second pre-determined threshold.

20 Claims, 6 Drawing Sheets

SYSTEMS AND METHODS FOR CLOUD-BASED CONTINUOUS MULTIFACTOR AUTHENTICATION

TECHNICAL FIELD

This relates generally to the field of authenticating communication devices, and more specifically to an apparatus and methods thereof for continuous multifactor authentication.

BACKGROUND

As attackers are increasingly breaking into user devices that use single-factor authentication, and sometimes even those with two factors, use of multifactor authentication (MFA) has become more important than ever. Since the user devices can be compromised after being authenticated, there is a need to constantly monitor that the user devices remain authenticated.

Generally, a trust score is assigned to the user device. Depending on the trust score, the user is authorized or denied access to the device. However, there is no secure and convenient way of authenticating the user when the trust score is below a certain threshold. Moreover, there is a need to securely and continuously authenticate the users to provide access to the user devices.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

In accordance with common practice some features illustrated in the drawings cannot be drawn to scale. Accordingly, the dimensions of some features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Described herein are systems and methods for cloud-based continuous multifactor authentication. According to some embodiments, the system for cloud-based continuous multifactor authentication includes an apparatus, a plurality of sensors, and a server. In some embodiments, the apparatus, e.g., a safe case, includes a housing arranged to hold a personal communication device. The personal communication device may be a smartphone, a wearable gadget, a tablet, a notebook, or any suitable communication devices.

In some embodiments, the plurality of sensors is at least partially supported by and in communication with the apparatus. In some embodiments, the plurality of sensors receives a set of trait data from a user of the personal communication device. In some embodiments, the plurality of sensors receives trait data in response to a challenge from the server to the personal communication device.

As used herein, "trait data" include biometric data but are not limited to genetically determined characteristics. For example, locations, networks in the vicinity, etc., can reveal movement patterns and/or network usage patterns. The movement and/or network usage patterns in turn can reveal traits of a user, e.g., traveling along certain routes on daily basis. The trait data thus disclose at least one distinguishing quality or characteristic that belongs to a person.

In some embodiments, the server is in communication with the apparatus. In some embodiments, the server receives a notification from the apparatus indicating a first authentication score is below a first pre-determined threshold. In some embodiments, the server uses a neural network to provide a challenge to the personal communication device. In some embodiments, the server selects the challenge based on one or more data sensor including a set of trait data of the user of the personal communication device. In some embodiments, the one or more data sensor is provided by the apparatus or the personal communication device.

In some embodiments, the personal communication device, upon receiving the challenge, sends the response to the server. In some embodiments, the server calculates a second authentication score based on the response. In some embodiments, the server allows the personal communication device electronic access when the second authentication score is above the first pre-determined threshold. In some embodiments, the server uses a second threshold for the second authentication score, which is different from the first pre-determined threshold. In some embodiments, the server assigns a set of weights to the response. In some embodiments, the response includes a set of trait data. In some embodiments, the server calculates the second authentication score based on the set of trait data and the set of weights. In some embodiments, the server assigns the set of weights to the set of trait data based at least on one of a context, a sensor data, and aggregated data from a plurality of apparatuses. In some embodiments, the context is determined based at least one of whether the user is moving, a proximity of the user to the personal communication device, and a proximity of the user to the housing. In some embodiments, the sensor data includes fingerprints, facial recognition, voice, or behavioral trait data.

In some embodiments, a set of trait data is abandoned, and the server provides a challenge that requests the personal communication device to provide a new set of trait data. In some embodiments, the plurality of sensors provides the new set of trait data to the personal communication device. Assigning the set of weights to the new set of trait data, the server calculates the second authentication score. In some embodiments, a multi-trait-based trust score is assigned to each response. In some embodiments, at least one of a voice pattern, a gait, a device orientation, a pattern of life, one or more trusted network, and one or more trusted peripheral is used as a trait.

In some embodiments, the server sends more than one challenge to the personal communication device. In some embodiments, the server receives more than one response from the personal communication device. In some embodiments, the server selects a challenge based on a random selection of a challenge from among a plurality of pre-determined challenges. Alternatively, in some embodiments, the server selects a challenge based on a context. In some embodiments, the server performs a determination of whether or not the first authentication score is above the pre-determined threshold periodically. In some embodiments, the server performs a determination of whether or not the first authentication score is above the pre-determined threshold at certain time intervals. In some embodiments, the server performs a determination of whether or not the first authentication score is above the pre-determined threshold when one or more sensor data changes satisfy one or more pre-determined criteria.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first device could be termed a second device, and, similarly, a second device could be termed a first device, without departing from the scope of the various described embodiments. The first device and the second device are both devices, but they are not the same device, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming but would nevertheless be a routine undertaking for those of ordinary skill in the art of image capture having the benefit of this disclosure.

In general, MFA technologies use multiple authentication factors, such as something the user knows, something the user has, something the user is, and a context. Factors that the user knows include usernames, passwords, passphrases, Personal Identification Numbers (PINs), and confidence images (an image the user pre-selects that confirms that the site is genuine). Authentication factors that the user has include tokens and one-time passwords (a system sends a code to the user that the user should type in, in addition to his password), and encryption keys. Authentication factors related to what the user is include biometrics and behavior-based authentication.

Some of these authentication methods have seen significant improvements in recent years. As such, advances in Public Key Infrastructure (PKI) encryption include virtual smart cards that use trusted platform modules (TPM). Virtual smart cards safeguard encryption keys while limiting their use to the device that has the TPM. As an example, access from a user device from inside a location that the user frequently visits would allow a more relaxed authentication, while access from a remote location, e.g., an internet cafe in another country, would trigger additional security measures to log on. The enterprise or server can further take into consideration times when the user has never connected before and devices or IP addresses they have never used before.

Since each of the above-mentioned methods has its own advantages and disadvantages, combinations of more than two methods have attracted much attention. Amongst these methods, using trait data have their pros and cons. Using trait data, the user doesn't have to memorize the passwords. However, a biometric method using only one set of trait data can fail if it cannot properly read or accurately confirm a fingerprint whereas a password that the user correctly enters will succeed. Moreover, a damaged fingerprint, a hand that is in a cast, or objections to biometric measurement based on religious grounds can make biometric methods unavailable. Further, voice recognition biometrics and facial recognition are not fully developed to be relied on as a single source of authentication.

Every authentication process that depends on what the user remembers, or carries can increase access failures or add security risks. With context-based authentication, if an attacker has possession of the user's device, they could control this factor of authentication, aiding their attack. The same goes for sending tokens via voice calls, emails, or texts; if someone has already compromised the device or account, then they have also compromised this form of authentication. In any such cases, the user must authenticate by some other means.

At high level, MFA is an approach to computerized security procedures that requires the user to provide more than one form of verification to prove their identity in order to gain access to a device. However, another issue arises when the user who is initially authorized to access the device, is no longer in possession of that device. In other words, an otherwise authorized device, no longer satisfies a certain trust score. To tackle this issue, a Continuous MFA (CMFA) method is disclosed herein, to assure that authorized users access a device at all times.

In some embodiments, as the user changes from moving to not moving and/or from holding the device to not holding the device, the number of factors in the CMFA varies. For example, when the user is not moving, gaits may not be an accurate CMFA factor. Thus, the trust score that is above the threshold at one point may fall below the threshold at a different time. Disclosed herein is a method and an apparatus to securely use a CMFA method with a challenge and response technique.

Figure 1:
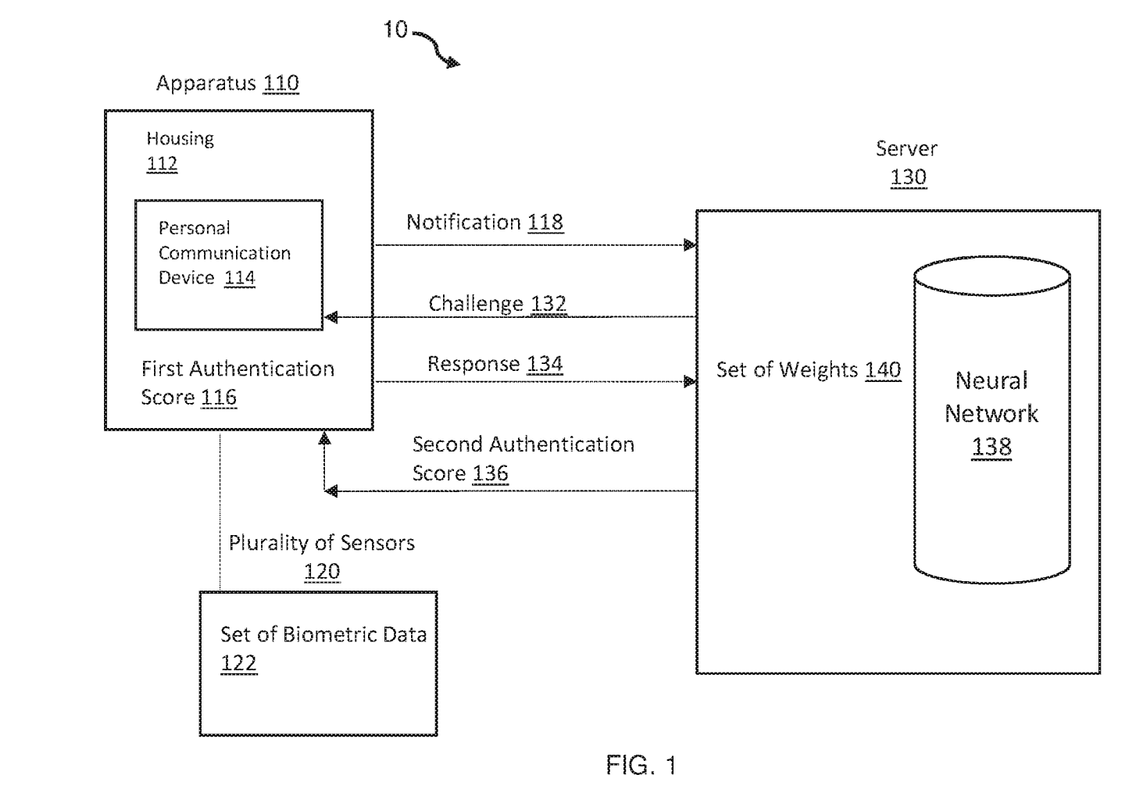
FIG. 1 is a simplified block diagram of a cloud-based continuous multifactor authentication system, in accordance with some embodiments.

Referring to FIG. 1, a simplified block diagram of a cloud-based continuous multifactor authentication system 10 is depicted, in accordance with some embodiments. In some embodiments, the cloud-based continuous multifactor authentication system 10 includes an apparatus 110, a plurality of sensors 120, and a server 130. In some embodiments, the apparatus includes a housing 112 that is arranged to hold a personal communication device 114. The personal communication device 114 may be a smartphone, a wearable gadget, a tablet, a notebook, or any suitable communication devices. In some embodiments, the plurality of sensors 120 is at least partially supported by the housing 112. In some embodiments, the plurality of sensors 120 is in communication with the apparatus. In some embodiments, the plurality of sensors 120 receives a set of trait data, e.g., a first set of trait data 122, from a user of the personal communication device 114. In some embodiments, the plurality of sensors 120 receives trait data in response 134 to a challenge 132 from the server 130 to the personal communication device 114. In some embodiments, the plurality of sensors 120 receives trait data for initial authentication of the personal communication device 114.

In some embodiments, the server 130 is in communication with the apparatus 110. In some embodiments, the server 130 receives a notification 118 from the apparatus 110. In some embodiments, the notification 118 indicates a first authentication score 116 is below a first pre-determined threshold. In some embodiments, the server 130 includes a neural network 138. When the server 130 receives the notification 118, the server 130 provides the challenge 132 to the personal communication device 114. In some embodiments, the server 130 uses the neural network 138 to provide the challenge 132. In some embodiments, the server 130 selects the challenge 132 based on one or more data sensor. In some embodiments, the one or more data sensor includes a set of trait data of the user of the personal communication device 114. In some embodiments, the one or more data sensor is provided by the apparatus 110. In some embodiments, the one or more data sensor is provided by the personal communication device 114.

In some embodiments, the neural network 138 is installed on the server 130 and neural network parameters are downloaded prior to authenticate the user of the personal communication device 114. In some embodiments, the neural network 138 includes a plurality of layers (not shown), including an input layer to receive the conditioned signal from a conditioning unit, and a number of layers adjacent the input layer, e.g., hidden layer(s) adjacent the input layer and an output layer adjacent the hidden layer(s). In some embodiments, the layers include logical units, e.g., neurons, as referred to by those of ordinary skill in the art, such that each neuron consists of inputs and an output with the output as a function of the inputs and each input is modified by a weight. Once the neural network 138 on the server 130 is trained, a set of weights 140 are used as the neural network parameters of the neural network 138. In some embodiments, a plurality of learned weights is used by the neural network 138 during the authentication phase for feature extraction. It should be noted that the neutral network 138 of the server 130 can be any suitable machine learning packages which is trainable with any suitable training method.

In some embodiments, the personal communication device 114, upon receiving the challenge 132, sends the response 134 to the server 130. In some embodiments, the server 130 calculates a second authentication score 136. In some embodiments, the second authentication score 136 is calculated based on the response 134 to the challenge 132. In some embodiments, the server 130 allows electronic access to resources associated with the personal communication device 114, e.g., gating electronic signal to allow access to the personal communication device 114, when the second authentication score 136 is above the first pre-determined threshold.

It should be noted that electronic access to the resources associated with the personal communication device 114 are not limited to the access to the personal communication device 114. For example, in order to access to an application running on a computer, a user may use an application on the personal communication device 114 to scan a QR code displayed on the display of the computer. Upon scanning the QR code, the personal communication device 114 extracts information from the QR code, authenticate the user, and transmits the authentication result to the server 130. The server 130 then communicates with the computer to allow or deny the user's access to the application on the computer. As such, the electronic access to the resources associated with the personal communication device 114 includes the application, even though the application runs on a separate device. Accordingly, the electronic access to the resources associated with the personal communication device 114 includes any resources that the user can request access utilizing the personal communication device 114, e.g., electronic access to websites, door locks, car locks, computers, backpacks 290 (FIG. 2), bank accounts, etc.

In some embodiments, the server 130 denies electronic access to resources associated with the personal communication device 114, e.g., gating electronic signal to cease or deny access to the personal communication device 114, when the second authentication score 136 is below the first pre-determined threshold. In some embodiments, the server 130 allows the personal communication device 114 electronic access when the second authentication score 136 is above a second pre-determined threshold. In some embodiments, the server 130 denies the personal communication device 114 electronic access, when the second authentication score 136 is below the second pre-determined threshold. In some embodiments, the first pre-determined threshold is different from the second pre-determined threshold. In some embodiments, the first pre-determined threshold is same as the second pre-determined threshold. In some embodiments, whether the first pre-determined threshold is different from or same as the second pre-determined threshold is determined based on a pre-determined policy. In some embodiments, whether the first pre-determined threshold is different from or same as the second pre-determined threshold is determined based on a pre-determined context. For example, if the personal communication device has changed hands from user A to user B, based on a policy, or based on a pre-determined context, A's pre-determined threshold is 80% while B's pre-determined threshold is 88%.

In some embodiments, the server 130 assigns a set of weights 140 to the response 134. In some embodiments, the response 134 includes a set of trait data 122. In some embodiments, the server 130 calculates the second authentication score 136 based on the set of trait data 122 and the set of weights 140.

In some embodiments, the server 130 assigns the set of weights 140 to the set of trait data based on a context. In some embodiments, contextual factors include a user's verifiable location, a time when the user authenticates to access the user device, and a device or an IP address the user is using. In some embodiments, a context adds the user's whereabouts, e.g., with the time and the IP address or device they are using, as a consideration when determining whether to make authentication easier or more difficult. In some embodiments, technologies such as smartphones, Bluetooth policy beacons, and GPS are used to determine context.

In some embodiments, the context is determined based on whether the user is moving. In some embodiments, the context is determined based on a proximity of the user to the personal communication device 114. In some embodiments, the context is determined based on a proximity of the user to the housing 112.

In some embodiments, the server 130 assigns the set of weights 140 to the trait data based on data received from the plurality of sensors 120. In some embodiments, trait data includes fingerprints, facial recognition, voice, etc. In some embodiments, another type of trait data, i.e., behavioral trait data, is used. The behavioral trait data identify a user's behavior, such as how they type on a keyboard, or how they move from one location to another, among others.

In some embodiments, the sensor data is determined based on whether the user is moving, e.g., based on data received from accelerometer, gyroscope, compass, barometer, and/or motion sensor, etc. In some embodiments, the sensor data is determined based on a proximity of the user and the personal communication device 114. In some embodiments, the sensor data is determined based on a proximity of the user and the housing 112.

In some embodiments, the server 130 assigns the set of weights 140 based on aggregated data received from a plurality of apparatuses. In some embodiments, each of the plurality of apparatuses includes a housing that is arranged to hold a respective personal communication device.

A certain set of trait data can, temporarily or permanently, be unavailable for authentication. For example, a damaged fingerprint, a hand that is in a cast, or objections to certain biometric measurements based on religious grounds can render the set of trait data unavailable or unfit for authentication. In another example, voice recognition biometrics and facial recognition are still being developed, hence, cannot be fully relied on. Therefore, in some embodiments, the server 130 abandons the set of trait data 122 and sends the challenge 132 that requests the personal communication device 114 to provide a new set of trait data. In some embodiments, the plurality of sensors 120 provides the new set of trait data to the personal communication device 114. Assigning the set of weights 140 to the new set of trait data, the server 130 calculates the second authentication score 136. In some embodiments, a multi-trait-based trust score is assigned to each response 134. In some embodiments, at least one of a voice pattern, a gait, a device orientation, a pattern of life, one or more trusted network, and one or more trusted peripheral is used as a trait.

In some embodiments, the server 130 sends more than one challenge 132 to the personal communication device 114. In some embodiments, the server 130 receives more than one response 134 from the personal communication device 114. In some embodiments, the server 130 determines a trust score for each response 134 received from the personal communication device 114. For example, when the user is moving and talking at a same time, a first trust score is determined for the user's gaits and a second trust score is determined for the user's voice. Subsequently, a weight is assigned to each of the first and second trust scores based on pre-determined criteria. For example, a weight of 45% is assigned to the user's gaits, and a weight of 55% is assigned to the user's voice. Alternatively, when the user is sitting still and streaming video, a first trust score is determined for user's facial image and a second trust score is determined for user's iris scan. Subsequently, a weight is assigned to each of the first and second trust scores based on the pre-determined criteria. For example, a weight of 65% is assigned to the user's facial image, and a weight of 35% is assigned to the user's iris scan.

In some embodiments, the server 130 selects a challenge 132 based on a random selection of a challenge from among a plurality of pre-determined challenges. Alternatively, in some embodiments, the server 130 selects a challenge 132 based on a context.

In some embodiments, the server 130 performs a determination of whether or not the first authentication score 116 is above the pre-determined threshold periodically. In some embodiments, the server 130 performs a determination of whether or not the first authentication score 116 is above the pre-determined threshold at certain time intervals. In some embodiments, the server 130 performs a determination of whether or not the first authentication score 116 is above the pre-determined threshold when one or more sensor data changes satisfy one or more pre-determined criteria. For example, when the motion sensor data changes fall less than a threshold, or rise above a threshold, it indicates that the device switches from moving to not moving or vice versa. As another example, when the location sensor data changes, it indicates that the device has traveled certain distance. Passing a threshold or changing the location sensor data can trigger the server 130 to perform the determination of whether or not the first authentication score 116 is above the pre-determined threshold.

In some embodiments, the server 130 provides the challenge 132 to the personal communication device 114 based on a random challenge selected from a plurality of pre-defined challenges. In some embodiments, the server 130 provides the challenge 132 to the personal communication device 114 based on a context. For example, if the user is moving, the server 130 provides the challenge 132 to the personal communication device 114 for collecting the heart rhythm, or gait. As another example, if the user is known to have a distinct voice and the ambient noise level is low, the server 130 provides the challenge 132 to the personal communication device 114 for collecting voice sample. In some embodiments, the challenge 132 includes one or more pre-configured challenges. For example, a system administrator pre-configures one or more particular types of challenge as the challenge, e.g., requesting voice sample, seeking fingerprint, etc.

In some embodiments, the server 130, in response to detecting an authorization score for a set of trait data below the pre-determined threshold, selects a different set of trait data. In such instances, the server 130 provides a challenge 132 to the personal communication device 114, requiring a new set of trait data. Alternatively, in some embodiments, the server 130, in response to detecting an authorization score for a set of trait data below the pre-determined threshold, assigns a different set of weights to the trait data.

In some embodiments, the server 130, upon determining that the authentication score is above the pre-determined threshold, gates full electronic access to the personal communication device 114. Alternatively, in some embodiments, the server 130, upon determining that the authentication score is above the pre-determined threshold, gates electronic access to pre-determined parts or components of the personal communication device 114. For example, the server 130 disables wireless communication capabilities or access to certain sensors.

Figure 2A:
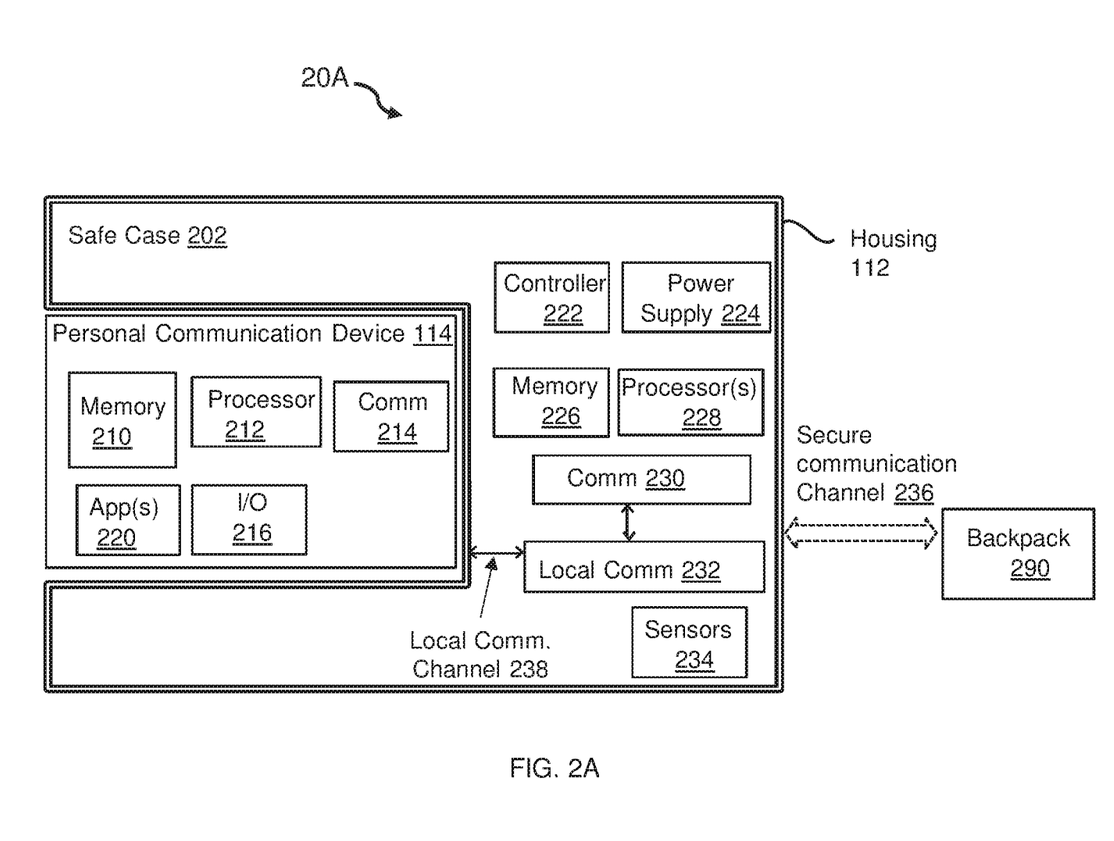
FIGS. 2A and 2B illustrate an apparatus for a cloud-based continuous multifactor authentication system, in accordance with some embodiments.
Figure 2B:
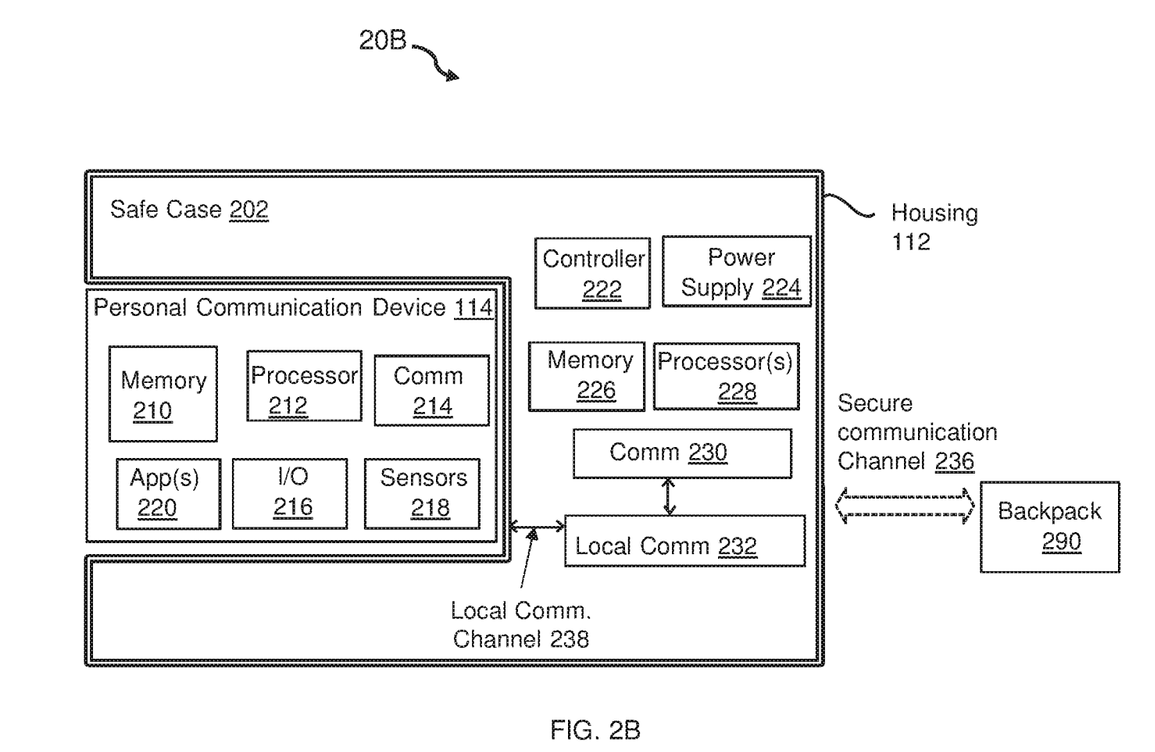

FIGS. 2A and 2B illustrate an apparatus 20, according to some embodiments. In some embodiments, the apparatus 110 includes a safe case 202. In some embodiments, the safe case 202 includes one or more additional sensors 234, as is shown in FIG. 2A. As explained with reference to FIG. 1, the server 130 receives the sensor data from the plurality of sensors 120. Further as explained above with reference to FIG. 1, in some embodiments, one or more gaits can be used as the set of trait data 122. In some embodiments, the plurality of sensors 120 (FIG. 1) includes the one or more additional sensors 234 on the safe case 202. In some embodiments, the plurality of sensors 120 (FIG. 1) includes one or more additional sensors 218 that are located on the personal communication device 114, as shown in FIG. 2B.

In some embodiments, the personal communication device 114 is held by the housing 112. In some embodiments, the personal communication device 114 includes a memory 210, one or more processors 212, a local communication device 214, an input/output device 216, and one or more applications 220. In some embodiments, the personal communication device 114 further includes at least one sensor 218, as is shown in FIG. 2B. In some embodiments, the at least one sensor 218 receives trait data from surroundings or the user of the personal communication device 114. In some embodiments, the one or more processors 212 are in communication with the memory 210 and the at least one sensor 218.

As a non-limiting example, when the user is moving, gaits can be used as the set of trait data 122. However, when the user is sitting and his face is in a close distance from a screen of the personal communication device 114, based on the orientation of the device, facial image is used as the set of trait data 122. In some embodiments, the facial image of the user is detected by one or more infrared sensors, e.g., the one or more additional sensors 218, on the personal communication device 114. In some embodiments, the facial image of the user is detected by one or more infrared sensors, e.g., the one or more additional sensors 234, on the safe case 202. In some embodiments, other identity-based trait data can be used. In some embodiments, the other identity-based trait data includes fingerprint, voice recognition, keystroke dynamics, signature, etc. In some embodiments, the other identity-based trait data includes vital signs such as heart rhythm, pulse rhythm, blood pressure patterns, odor, pattern of life, driving patterns, moving patterns, etc.

In some embodiments, the safe case 202 protects the personal communication device 114 mechanically and against tracking or spying. In some embodiments, the safe case 202 includes a controller 222, a power supply 224, a memory 226, one or more processors 228, and a communication device 230. In some embodiments, the one or more possessors 228 perform the functions of the server 130 described above with reference to FIG. 1. In some embodiments, the controller 222 performs the functions of the one or more processors 228 described above with reference to FIG. 1. In some embodiments, the controller 222 and the one or more processors 228 perform the functions of the server 130 described above with reference to FIG. 1. In yet some other embodiments, components outside the safe case 202, e.g., a processor on the personal communication device 114, on a backpack 290, and/or on a cloud server, perform the functions of the server 130 described above with reference to FIG. 1. The safe case 202 can have one or more moveable components, e.g., a hood, operable to slide to one or more positions, e.g., up or down, as well as non-moveable components. In such embodiments, the one or more moveable components, when in a first position, e.g., hood pushed down, are mateable, e.g., mechanically and/or electrically, with the non-moving components to form a housing assembly, e.g., the housing 112. The housing 112 forms an enclosure that at least partially supports and holds the personal communication device 114, e.g., a partial enclosure or a whole enclosure encapsulating the personal communication device 114. When in certain position(s), the housing 112, along with other components of the safe case 202, protects the personal communication device 114 against tracking or spying, e.g., by audio jamming, camera covering, and/or RF shielding, etc. When the one or more moveable components of the housing 112 are in certain other position(s), e.g., hood slid up, a user can take the personal communication device 114 out of the housing 112 and place the personal communication device 114 in a non-protected mode.

In some embodiments, the controller 222 is coupled to the communication device 230. Embodiments of the controller 222 include hardware, software, firmware, or a combination thereof.

In some embodiments, the apparatus 20 includes a local communication device 232 which is at least partially supported by the housing 112. In some embodiments, the local communication device 232 is connectable to the personal communication device 114, the safe case 202, and the server 130. In some embodiments, the local communication device 232 establishes a local communication channel 238 between the personal communication device 114 and the safe case 202. In some embodiments, through the local communication channel 238, the one or more processors 228 obtains the set of trait data from the personal communication device 114, e.g., obtaining the sensor data from the sensors 218 (FIG. 2B). In some embodiments, the controller 222 manages a segment of the local communication channel 238 between the safe case 202 and the personal communication device 114 through the management of the local communication device 232. In some embodiments, the controller 222 also manages a secure communication channel 236 between the safe case 202 and the backpack 290.

A backpack (also referred to as a supplemental functional device), as described herein, is a device connectable to the personal communication device 114 through the safe case 202 and provides supplemental functional functions to the personal communication device 114. A peripheral interface connects the supplemental functional device 290 to the safe case 202 and the local communication device 232 further connects the peripheral interface to the personal communication device 114. As such, the peripheral interface is a modular interface for the backpack 290, which is a detachable device that allows supplemental hardware and software functionalities to be provided to the user of the safe case 202.

For example, the backpack 290 can include sensors to detect RF energy emission, sniff uplink TCP/IP transfer, or detect the presence of chemicals or drugs, etc. The additional information collected by the sensors on the backpack 290 can be used by the safe case 202 as the set of trait data 122 (FIG. 1).

In addition to managing the communication channel 238, the controller 222 logs data in a secure area of the safe case 202. Logging data in the secure area of the safe case 202 has the advantage of providing trustworthy status reports of the personal communication device 114 for analysis in case the personal communication device 114 has been or potentially has been compromised. For example, many high-value enterprises invest significantly to implement tight monitoring and access control within their own networks but lose visibility and control to external networks such as the cellular networks or WiFi hotspots. Once a smartphone is compromised, the status report from the phone operating system may not be trustworthy. By logging data in a secure area of the apparatus, reliable status reports can be generated for Enterprise Mobility Management (EMM), and EMM can then rely on the reliable information to limit the threat spread.

In some embodiments, the safe case 202 includes a power supply 224. The power supply 224 supplies power to the local communication device 232, and/or the controller 222. In some embodiments, the power supply 224 includes at least one of a battery, a charging socket, a USB connector, a power plug, and/or a power socket. In some embodiments, the power supply 224 includes a connector for a battery. In some embodiments, the power supply 224 includes a plurality of power supplying components, e.g., one battery providing power to the local communication device 232 and/or the controller 222, etc. The plurality of power supply components can be connected to be charged together, charged separately, aggregating power to supply to one or more hardware electronic components of the safe case 202, or separately providing power to one or more hardware electronic components of the safe case 202.

In some embodiments, the local communication device 232 receives the information and passes to a validation engine. In some embodiments, the validation engine is stored in the memory 226 to be executed by controller 222 and validates one of more components of the personal communication device 114 based on the information received from the local communication device 232.

In some embodiments, the safe case 202 is a secure hardware, with hardware root of trust. For example, the safe case 202 includes a unique digital key created for the safe case 202. In some embodiments, the unique digital key is stored on the safe case 202. In some embodiments, the safe case 202 includes a secure boot loader. In some embodiments, the safe case 202, through code signing, authenticates processes in order to prevent hardware side channel attack. The authentication through code signing enables the data collected by sensors 234 on the safe case 202 to be independent from the sensors 218 (FIG. 2B) on the personal communication device 114. Therefore, in case the personal communication device 114 is compromised, the trait data collected by the one or more additional sensors 234 on the safe case 202 can be used for authentication.

Figure 3:
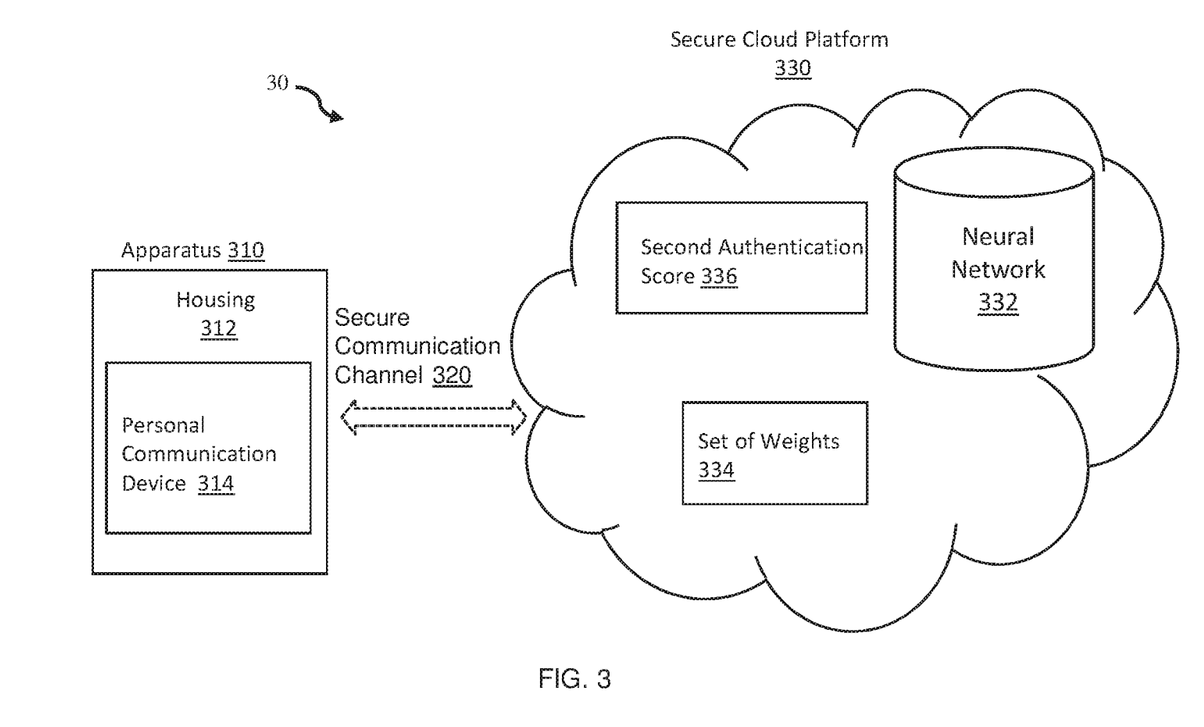
FIG. 3 is a simplified block diagram of a cloud-based continuous multifactor authentication system, in accordance with some embodiments.

FIG. 3 illustrates a simplified block diagram of a cloud-based multifactor authentication system 30, according to some embodiments. In some embodiments, an apparatus 310 includes a housing 312 that is arranged to hold a personal communication device 314, and a plurality of sensors (not shown). In some embodiments, the housing 310 holds the personal communication device 314 and the plurality of sensors. In some embodiments, when the housing 310 holds the personal communication device 314, through the apparatus, the personal communication device 314 is in communication with a secure cloud platform 330, via a secure communication channel 320. Therefore, any communication between the personal communication device 314 and the secure cloud platform 330 is secure. In some embodiments, the secure cloud platform 330 includes a neural network 332. In some embodiments, the secure cloud platform 330 assigns a set of weights 334 to a set of trait data provided by the plurality of sensors and through the secure communication channel 320. In some embodiments, the secure cloud platform 330 calculates a second authentication score 336 based on the set of weights 334.

Figure 4A:
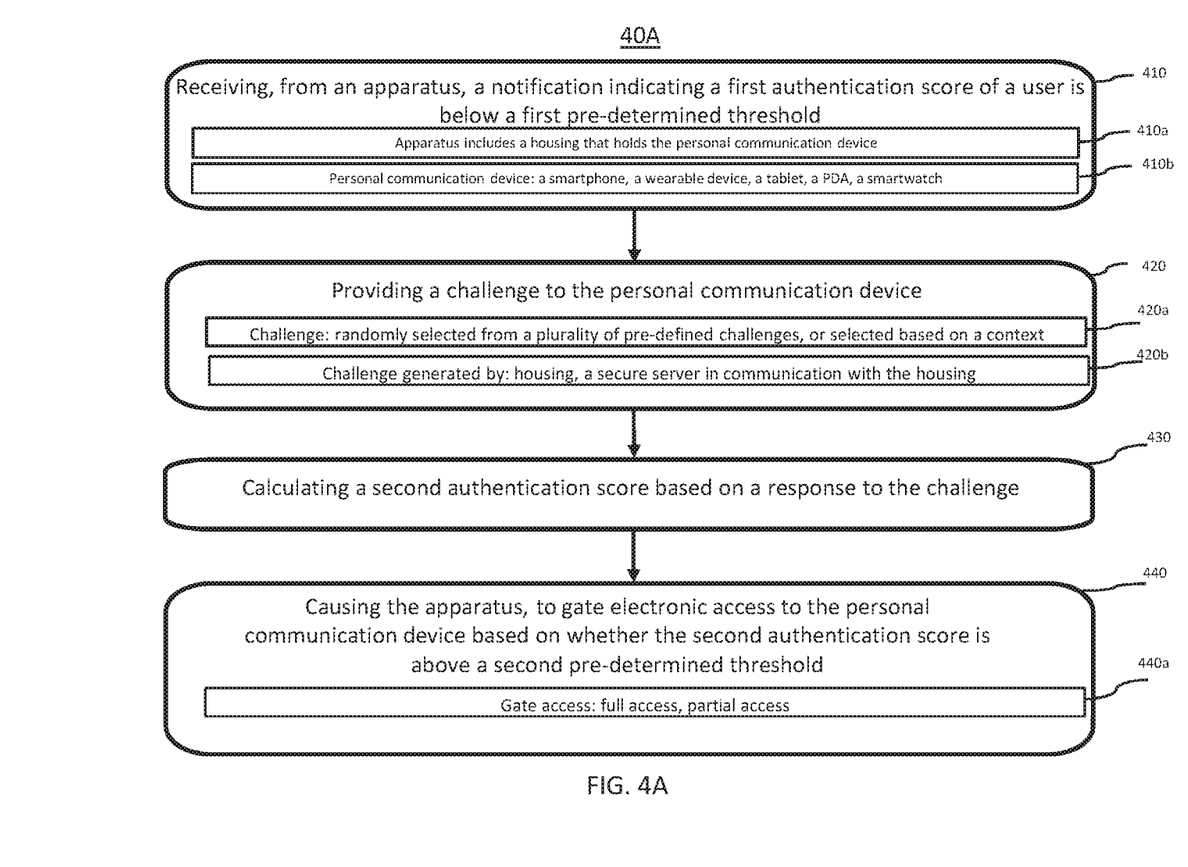
FIGS. 4A and 4B are a flowchart illustrating a method of cloud-based continuous multifactor authentication, in accordance with some embodiments.

FIG. 4A illustrates a flowchart of a method 40A for cloud-based multifactor authentication, according to some embodiments. As represented by block 410, the method 40A includes receiving, from an apparatus, e.g., the apparatus 110 in FIGS. 1 and 3, or the apparatus 20 in FIGS. 2A and 2B, a notification indicating a first authentication score of a user is below a first pre-determined threshold.

In some embodiments, the apparatus includes a housing which is arranged to hold the personal communication device, as represented by block 410*a*. In some embodiments, the personal communication device is a smartphone, a wearable device, a tablet, a Personal Digital Assistance (PDA), a smartwatch, etc. as represented by block 410*b*. In some embodiments, a plurality of sensors, at least partially supported by the housing, receives trait data from the user of the personal communication device. In some embodiments, the plurality of sensors is in communication with the apparatus.

In some embodiments, the method 40A includes providing a challenge to the personal communication device, as represented by block 420. As represented by block 420*a*, in some embodiments, the server selects a random challenge from among a plurality of pre-determined challenges. Alternatively, in some embodiments, the server selects a challenge based on a context. In some embodiments, the challenge is generated by the apparatus. In some embodiments, the challenge is generated by a secure server in communication with the apparatus, as is represented by block 420*b*. In some embodiments, the challenge is sent through a secure communication channel.

In some embodiments, the method 40A includes calculating a second authentication score based on a response to the challenge, as represented by block 430. In some embodiments, the method 40A includes causing the apparatus, to gate electronic access to resources associated with the personal communication device, based on whether the second authentication score is above a second pre-determined threshold, as represented by block 440. In some embodiments, the response to the challenge includes a second set of trait data. As represented by block 440*a*, in some embodiments, upon the determination step, full electronic access to the personal communication device is granted. Alternatively, in some embodiments, upon the determination step, electronic access to pre-determined parts or components of the personal communication device is granted. For example, the server instructs the apparatus to disable wireless communication capability or certain sensors of the personal communication device.

Figure 4B:
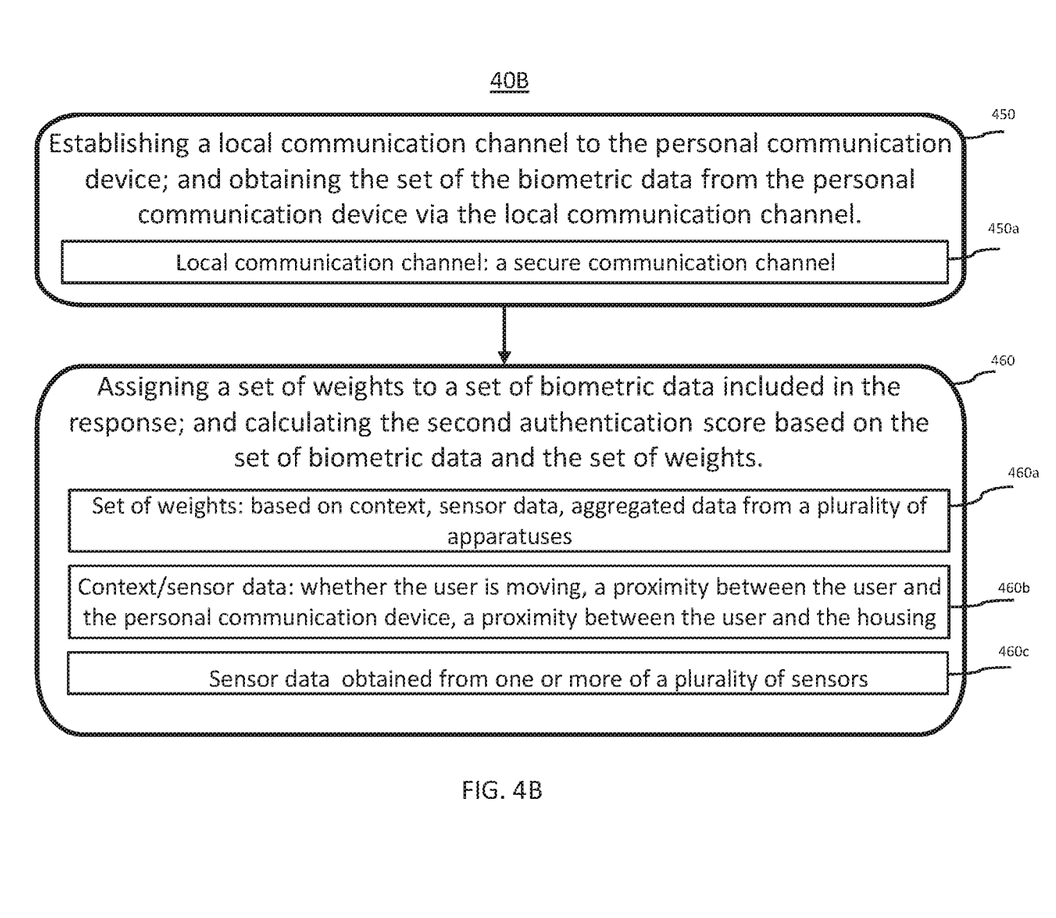

FIG. 4B illustrates a flowchart of a method 40B for cloud-based multifactor authentication, according to some embodiments. In some embodiments, the method 40B includes establishing a local communication channel to the personal communication device and obtaining the set of the trait data from the personal communication device via the local communication channel, as represented by block 450. In some embodiments, the local communication channel is a secure communication channel, as represented by block 450a. In some embodiments, the notification is received from via the secure local communication channel. In some embodiments, any communications between the personal communication device and the server is performed via the local secure communication channel.

In some embodiments, the method 40B includes assigning a set of weights to a set of trait data included in the response and calculating the second authentication score based on the set of trait data and the set of weights, as represented by block 460. In some embodiments, the set of weights is assigned to the set of trait data based on at least one of a context, a sensor data, and aggregated data from a plurality of apparatuses, as represented by block 460a. In some embodiments, at least one of the context, and the sensor data is determined based on at least one of whether the user is moving, a proximity of the user to the personal communication device, and a proximity of the user to the housing, as represented by block 460b. In some embodiments, the sensor data are obtained from one or more of a plurality of sensors, as represented by block 460c. In some embodiments, the plurality of sensors is located at least on one of the apparatus, a backpack attached to the apparatus, and the personal communication device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A system comprising:
    an apparatus including a housing arranged to hold a personal communication device;
    a plurality of sensors, at least partially supported by the housing, operable to receive trait data of a user of the personal communication device; and
    a server, in communication with the apparatus, operable to:
        receive, from the apparatus, a notification indicating a first authentication score of the user is below a first pre-determined threshold;
        provide a challenge to the personal communication device, wherein the challenge is selected based on one or more sensor data obtained by at least one of the apparatus or the personal communication device;
        calculate a second authentication score based on a response to the challenge; and
        cause the apparatus to gate electronic access to resources associated with the personal communication device based on whether the second authentication score is above a second pre-determined threshold.

2. The system of claim 1, wherein the server is further operable to:
    assign a set of weights to the response, wherein the response includes a set of trait data; and
    calculate the second authentication score based on the set of trait data and the set of weights.

3. The system of claim 2, wherein the set of weights is assigned based on at least one of a context, a sensor data, and aggregated data from a plurality of apparatuses, and wherein each of the plurality of apparatuses includes a respective housing arranged to hold a respective personal communication device.

4. The system of claim 3, wherein the at least one of the context or the sensor data is at least one of whether the user is moving, a proximity between the user and the personal communication device, and a proximity between the user and the housing.

5. The system of claim 1, wherein the server is further operable to:
    establish a local communication channel to the personal communication device; and
    obtain the response from the personal communication device via the local communication channel, wherein the local communication channel is a secure channel.

6. The system of claim 1, wherein the challenge is selected based on at least one of a random challenge selected from a plurality of pre-defined challenges, a challenge selected based on a context, or a pre-configured challenge.

7. The system of claim 1, wherein the server is further operable to obtain the one or more sensor data from one or more of a plurality of sensors, and wherein the plurality of sensors is located at least on one of:
    the apparatus, a backpack attached to the apparatus, or the personal communication device.

8. The system of claim 1, wherein the server is further operable to gate electronic access by at least one of allowing full access to the personal communication device, or allowing access to pre-determined parts of the personal communication device.

9. A method comprising:
    receiving, from an apparatus including a housing arranged to hold a personal communication device used by a user, a notification indicating a first authentication score of the user is below a first pre-determined threshold;
    providing a challenge to the personal communication device, wherein the challenge is selected based on one or more sensor data obtained by at least one of the apparatus or the personal communication device;
    calculating a second authentication score based on a response to the challenge; and
    causing the apparatus, to gate electronic access to resources associated with the personal communication device based on whether the second authentication score is above a second pre-determined threshold.

10. The method of claim 9, further comprising:
    assigning a set of weights to a set of trait data included in the response; and
    calculating the second authentication score based on the set of trait data and the set of weights.

11. The method of claim 10, wherein the set of weights is assigned based on at least one of a context, a sensor data, or aggregated data from a plurality of apparatuses, and wherein each of the plurality of apparatuses includes a respective housing arranged to hold a respective personal communication device.

12. The method of claim 11, wherein the at least one of the context or the sensor data is at least one of whether the user is moving, a proximity between the user and the personal communication device, or a proximity between the user and the housing.

13. The method of claim 9, wherein the notification is received via a secure communication channel.

14. The method of claim 9, further comprising:
establishing a local communication channel to the personal communication device; and
obtaining a set of the trait data from the personal communication device via the local communication channel.

15. The method of claim 9, wherein the challenge is generated by at least one of the housing, or a secure server in communication with the apparatus, and wherein the generated challenge is sent through a secure communication channel.

16. The method of claim 9, wherein the challenge is selected based on at least one of a random challenge selected from a plurality of pre-defined challenges, a challenge selected based on a context, or a pre-configured challenge.

17. The method of claim 9, wherein the one or more sensor data are obtained from one or more of a plurality of sensors, and wherein the plurality of sensors is located at least on one of: the housing, a backpack attached to the apparatus, or the personal communication device.

18. The method of claim 9, wherein the first pre-determined threshold is different from the second pre-determined threshold.

19. The method of claim 9, wherein the first pre-determined threshold is same as the second pre-determined threshold.

20. The method of claim 9, wherein gating the electronic access includes at least one of allowing full access to the personal communication device, or allowing access to pre-determined parts of the personal communication device.

* * * * *